US012675894B2

(12) United States Patent
Zhmayev et al.

(10) Patent No.: US 12,675,894 B2
(45) Date of Patent: Jul. 7, 2026

(54) METHOD AND A SYSTEM FOR ASSESSING AND OPTIONALLY MONITORING OR CONTROLLING THE TEXTURE OF A SURFACE

(71) Applicant: BASF Coatings GmbH, Müenster (DE)

(72) Inventors: Yevgen Zhmayev, Hong Kong (CN); Fatmir Raka, Muenster (DE); Igor Millbaier, Muenster (DE); Georg Wigger, Muenster (DE); Daniel Briesenick, Muenster (DE); Harry Libutzki, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 449 days.

(21) Appl. No.: 18/253,241

(22) PCT Filed: Nov. 23, 2021

(86) PCT No.: PCT/EP2021/082674
§ 371 (c)(1),
(2) Date: May 17, 2023

(87) PCT Pub. No.: WO2022/117401
PCT Pub. Date: Jun. 9, 2022

(65) Prior Publication Data
US 2023/0419516 A1 Dec. 28, 2023

(30) Foreign Application Priority Data
Dec. 2, 2020 (EP) ..................................... 20211136

(51) Int. Cl.
*G06T 7/42* (2017.01)
*G01B 11/30* (2006.01)
(Continued)

(52) U.S. Cl.
CPC .............. *G06T 7/42* (2017.01); *G01B 11/303* (2013.01); *G06T 7/001* (2013.01);
(Continued)

(58) Field of Classification Search
CPC ....... G06T 7/40–49; G06T 17/00; G06T 7/50; G06T 7/529; G06T 7/543; G06T 7/521;
(Continued)

(56) References Cited

U.S. PATENT DOCUMENTS 5,208,766 A * 5/1993 Chang .................. G01B 11/303
382/141
2019/0287237 A1* 9/2019 de Bonfim Gripp ..... G06T 7/64

FOREIGN PATENT DOCUMENTS

EP 1898207 A1 3/2008
JP 3185559 B2 7/2001
(Continued)

OTHER PUBLICATIONS

International Search Report and Written Opinion for corresponding PCT/EP2021/082674, mailed Mar. 23, 2022, 10 pages.

*Primary Examiner* — Andrew W Bee
*Assistant Examiner* — Caleb L Esquino
(74) *Attorney, Agent, or Firm* — Armstrong Teasdale LLP

(57) ABSTRACT

Disclosed herein is a computer-implemented method for assessing and optionally monitoring or controlling a texture of a surface. Additionally disclosed herein are a system including an input channel connected to a processing device, a processing device configured to derive and optionally monitor or control the at least one texture parameter of the surface, an output device and optionally at least on surface preparation device. Further disclosed herein is a computer program product for assessing and optionally monitoring or controlling a texture of a surface, including a data carrier storing a program code to be executed by a processor.

18 Claims, 3 Drawing Sheets

(51) Int. Cl.
G06T 7/00 (2017.01)
*G01N 21/45* (2006.01)

(52) U.S. Cl.
CPC .................. *G01N 2021/456* (2013.01); *G06T 2207/20021* (2013.01); *G06T 2207/20048* (2013.01); *G06T 2207/30108* (2013.01)

(58) Field of Classification Search
CPC . G06T 2207/20048; G06T 2207/20052; G06T 2207/20056; G06T 2207/20061; G06T 2207/20064; G06T 7/41; G06T 7/42; G06T 7/44; G06T 7/45; G06T 7/46; G06T 7/48; G01B 11/25–255; G01B 11/24–245; G01B 11/167; G01B 11/165; G01M 11/0271; G02B 27/60; A61B 6/4291; A61B 6/4035; G01N 23/041; G01D 5/38
See application file for complete search history.

(56) References Cited

FOREIGN PATENT DOCUMENTS

SE          536900 C2    10/2014
WO    WO-2013043103 A1 *   3/2013    ........... G01N 33/346

* cited by examiner

10

13  12  11

20

23  22  21

30

33  32  31

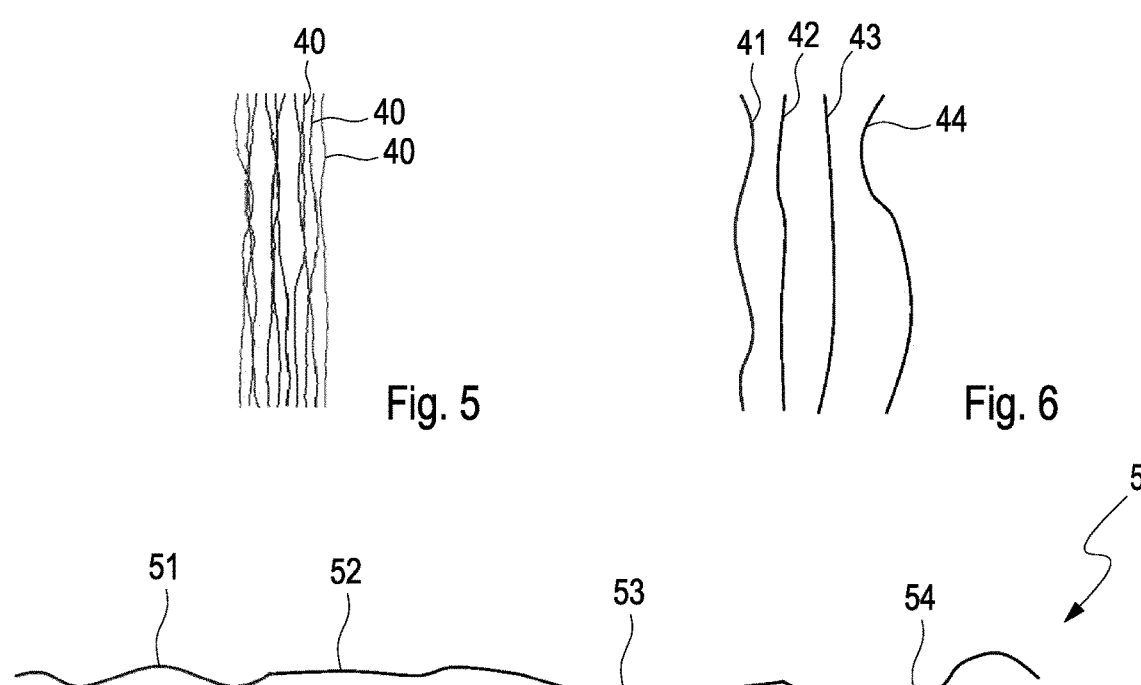
Fig. 5
Fig. 6
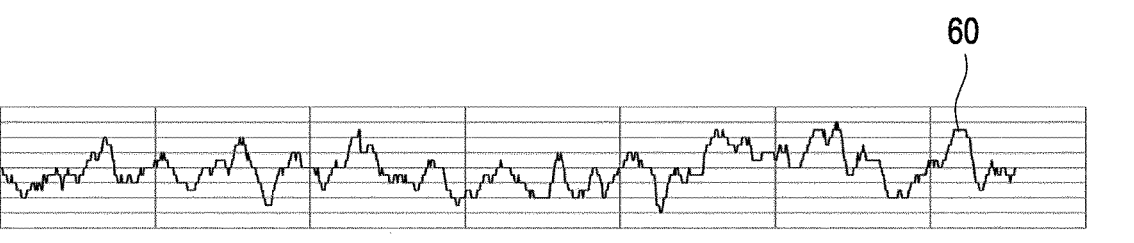
Fig. 7
Fig. 8
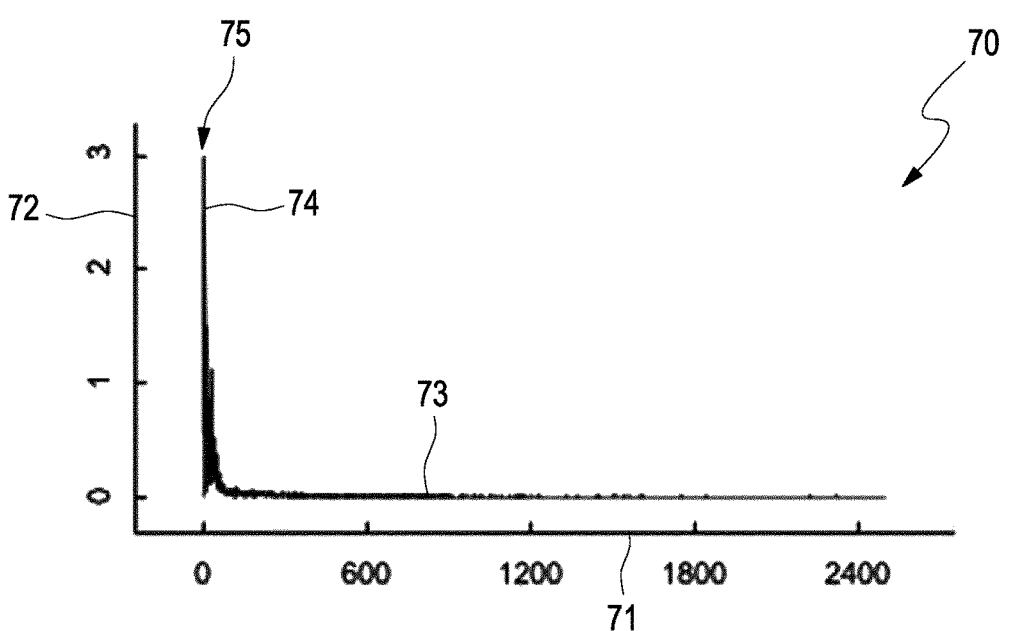
Fig. 9

METHOD AND A SYSTEM FOR ASSESSING AND OPTIONALLY MONITORING OR CONTROLLING THE TEXTURE OF A SURFACE

CROSS-REFERENCE TO RELATED APPLICATIONS

This application is a U.S. National Phase Application of International Patent Application No. PCT/EP2021/082674, filed Nov. 23, 2021, which claims priority to European Patent Application No. 20211136.5, filed Dec. 2, 2020, each of which are hereby incorporated by reference herein.

The invention relates to a computer-implemented method for assessing and optionally monitoring or controlling a texture of a surface, comprising the steps of providing via an input channel to a processing device image data of a surface, deriving at least one texture parameter of the surface from the provided image data by extracting a plurality of parallel lines from the processed image data using a pattern recognition algorithm, concatenating at least two extracted parallel lines and calculating a wavelength spectrum of each formed concatenated line by means of a fast Fourier transformation, and providing the at least one texture parameter via an output channel. Furthermore, the invention relates to a system comprising an input channel connected to a processing device, a processing device configured to derive and optionally monitor or control the at least one texture parameter of the surface, an output device and optionally at least on surface preparation device. Finally, the invention relates to a computer program product for assessing and optionally monitoring or controlling a texture of a surface, comprising a data carrier storing a program code to be executed by a processor.

BACKGROUND

Surfaces provide an object with an appearance. A surface reflects an incident light into eyes of an observer causing a visual impression of the object.

The way a surface reflects the incident light is defined, among other factors, by the roughness of the surface. The roughness may be practically zero, i.e. the surface is completely smooth like the surface of a mirror. Alternatively, the surface may comprise a certain degree of roughness, i.e. a texture or a structured profile, resulting in a certain degree of waviness of the surface.

Said texture may be regular, i.e. the texture may comprise one or more recurring patterns. Or the texture may be irregular, i.e. the texture may not comprise any recurring pattern. Of course, a texture may also comprise a combination of recurring and non-recurring patterns.

When an object is coated by applying at least one liquid or solid coating composition to the object and subsequently curing said applied coating composition(s), the surface determining the appearance of the object is provided by the obtained coating. Especially in the automotive industry, car body panels are provided with a coating for protective and aesthetic reasons.

Said coatings are typically composite coating systems requiring the application of a first coating, typically a colored basecoat coating, followed by the application of a second coating, generally a clearcoat, over the noncured or "wet" first coating. The applied first and second coatings are then jointly cured. Thus, such systems are often described as "wet on wet" or "two-coat/one bake". Drying processes that fall short of complete cure may be used between the application of the coatings.

Such coating systems are often selected when an exterior coating must possess an optimum visual appearance as well as superior durability and weatherability. As a result, the automotive industry has made extensive use of such coatings, especially for automotive body panels. Minimum performance requirements for clearcoat coating compositions intended for use on automotive body panels include high levels of adhesion, scratch and mar resistance, chip resistance, humidity resistance, and weatherability as measured by QUV and the like. The clearcoat composition must also be capable of providing a visual appearance characterized by a high degree of gloss, distinctness of image (DOI), and smoothness. Finally, such coatings must also be easy to apply in a manufacturing environment and be resistant to application defects.

Clearcoats used in such coating systems are normally applied at film builds significantly higher than the film builds at which the colored basecoat is applied. Such higher clearcoat film builds are an aspect of the system that contributes toward the desired appearance and or durability of the overall system.

Unfortunately, the higher film build requirement for clearcoats can increase the tendency of a clearcoat composition to sag. Occurring primarily on vertically orientated surfaces (i.e. surfaces having an angle of 90°±45° relative to the surface of the earth), sag maybe described as the undesirable downward flow of an applied coating. Often manifesting as drips or runs, sag is sometimes attributed to the "too heavy" or "too wet" application of a coating. Ideally, a commercially successful clearcoat composition will have an inherent tendency to resist sagging regardless of application and/or facility parameters. The more resistant a clearcoat is to sagging on vertically orientated surfaces, the easier it will be to apply in an automotive OEM facility.

However, a clearcoat resistant to vertically orientated sagging has traditionally shown increased resistance to flow on horizontally orientated surfaces (i.e. surfaces having an angle of 180°±45° relative to the surface of the earth). A coating composition's resistance to flow on horizontally orientated surfaces often results in "orange peel" and/or an overall unacceptable appearance in terms of the smoothness, gloss and DOI of the cured coating film. Orange peel may be described as a reoccurring irregularity in the surface of a cured film resulting from the inability of an applied wet film to "level out" after application. Although an orange peeled cured film may feel smooth to the touch, it appears as a continuous series of small bumps or dimples. The greater the inability of an applied wet film to "level out" or flow, the more pronounced or defined the small bumps or dimples will appear to the observer. The presence of such surface irregularities make it particularly difficult to obtain a smooth, glossy coated clear coated surface having a high DOI rating.

Since the sagging resistance of a coating composition and the ability to "level out" after application depends on the components of the coating composition as well as the coating process, it is desirable to optimize both the formulation of the coating composition as well as the coating process in order to produce the desired visual appearance of the resulting coating. Accordingly, an efficient method for assessing and optionally monitoring or controlling the texture of the coating, i.e. the surface of a coated object, is of great interest.

SUMMARY OF THE INVENTION

It is therefore an object of the invention to propose an efficient computer-implemented method and system for assessing a texture of a surface which allow to empirically verify, particularly during the preparation of the surface, whether a surface has the desired visual appearance. With particular preference, the computer-implemented method and system should allow to monitor the texture of the surface during its preparation process in order to gather information about the influence of production parameters on the resulting texture of the produced surface. Moreover, with particular preference, the computer-implemented method and system should allow to control the texture of the surface during its preparation process by assessing at least one texture parameter during preparation of the surface and by modifying at least one production parameter if the determined texture parameter is outside of a predefined range or value. This allows to tune the preparation process of the surface, preferably the production of a coating layer, in order to obtain the desired texture, thus resulting in a very efficient production of coated objects having the desired texture.

Inventive Computer-Implemented Method:

One aspect of the invention is a computer-implemented method for assessing and optionally monitoring or controlling a texture of a surface. The method comprises the steps of (i) providing via an input channel to a processing device image data of a surface, (ii) processing the provided image data by the processing device, (iii) deriving at least one texture parameter of the surface from the processed image data by extracting a plurality of parallel lines from the processed image data using a pattern recognition algorithm, forming at least one concatenated line by concatenating at least two extracted parallel lines and calculating a wavelength spectrum of each concatenated line by means of a fast Fourier transformation, and (iv) providing the at least one texture parameter via an output channel. Since the at least one texture parameter is directly related to the appearance of the surface, it can be used to qualify and/or quantify the texture of the surface. With particular preference, the method further includes a step (v) of monitoring or controlling the texture of the surface based on the derived texture parameter. This step (v) allows to relate production parameters to the obtained surface texture or to obtain the desired surface texture by modifying at least one production parameter in case the determined at least one texture parameter is outside of a predefined value or range.

The surface to be assessed and optionally monitored or controlled comprises a line pattern (denoted as reflected line pattern hereinafter). Said reflected line pattern is preferably obtained by projecting a predefined line pattern onto the surface. Since any distortion of the reflected line pattern from the predefined line pattern is directly related to the surface roughness, i.e. the texture of the surface, the distortion of the reflected line pattern can be analyzed to obtain the at least one texture parameter in step (iii). The at least one texture parameter therefore represents the distortion of the reflected line pattern from the predefined line pattern Processing the provided image data, i.e. extracting the reflected line pattern information from the provided image data via image processing before step (iii) of the inventive method facilitates the following analysis of the surface line pattern in said step (iii).

Step (i):

According to step (i) of the inventive method, image data of a surface comprising a line pattern is provided via an input channel to a processing device. The line pattern is obtained by projecting a predefined line pattern onto the surface. Suitable input channels are, for example, an image capturing device, a database, a network, a cloud, physical storage media such like RAM, ROM, EEPROM, solid state drives, flash memory, phase-change memory, optical disk storage, magnetic disc storage, or the like. The surface comprising the line pattern can be a coating layer, particularly a clearcoat layer. This embodiment of the method readily allows for optimizing the appearance of a coating applied to an object, i.e. a coating applied onto a car body part and the like.

Advantageously, the image data provided in step (i) is obtained immediately after applying the coating layer and/or during or after flashing off the applied coating layer and/or during or after curing the applied coating layer and/or during or after cooling the cured coating layer. The applied coating composition can be a liquid aqueous or solvent-based coating composition or a solid coating composition. Moreover, the coating composition can be a primer, a basecoat or a clearcoat coating composition. Application of the coating composition may be performed, for example, via pneumatic and/or electrostatic spray application known to the skilled person. "Flashing" or "flash off" is understood as passive or active evaporation of organic solvents and/or water from the applied coating material, preferably at 15 to 90° C. for a duration of 0.5 to 60 minutes. After the flashing phase, the formed coating film therefore comprises less water and/or solvent in comparison with the applied coating material but is only partly dried and not yet cured. In contrast, a cured coating film is no longer soft or tacky but instead is conditioned as a solid coating film which, even on further exposure to curing conditions, no longer exhibits any substantial change in its properties such as hardness or adhesion to the object. Capturing of the image in order to obtain the image data can be performed at any time after application of the coating composition to the object. Depending on the manufacturing process or the appearance problem to be solved, capturing of the image can be done repeatedly at predefined points in time or at randomly selected points in time to monitor the time dependence of the at least one texture parameter.

In many embodiments the image is preferably captured by a camera with an optical axis extending onto the surface. In one example, a white board comprising the predefined line pattern is illuminated by a white light source and the predefined line pattern of the white board is projected on the surface parallel to the optical axis of the camera. In case the surface comprises a certain degree of roughness, i.e. a texture, the predefined line pattern of the white board is distorted on the surface due to this surface roughness. In other words, both the position and the orientation of the camera relative to the surface to be assessed support capturing an image and obtaining image data of the surface comprising the line pattern by projecting a predefined line pattern onto said surface in a texture assessment arrangement.

The portion of the surface between at least two lines of the line pattern preferably has an area in a range from 10 mm×10 mm to 50 mm×50 mm, particularly an area of 15 mm×15 mm. In case the line pattern of the surface is a grid comprising intersecting vertical and horizontal lines, the surface portion corresponds to the area formed by the intersecting lines of the grid. Surface portions of this size are easy to realize when using line patterns and are sufficiently large to assess both a regular and an irregular texture of the surface.

The line pattern may be a periodic or non-periodic line pattern, preferably a periodic line pattern. Examples of periodic line patterns are simple periodic strip or line patterns, in particular simple line grids, multiple strip gratings interleaved or interlinked, or grids of strips having an internal (periodic) structure and whose intensity profile deviates from a step or box profile and, for example, has a Gauss, Doppelgauss or Lorentz profile.

In preferred embodiments, the line pattern comprises a plurality of lines, particularly a grid of lines, most preferably an orthogonal grid of lines. The line pattern may comprise a plurality of horizontal or vertical lines. Alternatively, the line pattern may comprise a grid, i.e. a plurality of crossing lines, particularly an orthogonal grid having a plurality of lines extending perpendicular to another plurality of lines. Preferred predefined line patterns projected onto the surface are therefore selected from a plurality of straight lines, particularly a grid of straight lines, most preferably an orthogonal grid of parallel straight lines.

Step (ii):

In step (ii) of the inventive method, the provided image data is processed by the processing device. Processing preferably comprises extracting the line pattern information from the image data provided in step (i). In this respect, it is particularly preferred if the image data provided in step (i) is pre-processed. Pre-processing may comprise applying a standard image processing algorithm like increasing a contrast, a sharpness or a brightness to the provided image data. Moreover, it is particularly preferred if the image data provided in step (i) or the pre-processed image data is converted into binary image data. A binary image is an image that consists of pixels that can have one of exactly two colours, namely black and white. The use of binary image data greatly increases the detectability of the reflected lines pattern because the binary image data supports the application of a pattern recognition algorithm preferably used in step (iii). Pre-processing of the provided image data can support the following conversion into binary image data.

Step (iii):

In step (iii) of the inventive method, the at least one texture parameter of the surface is derived from the deviation of line pattern information of the processed image data since the deviation of the reflected line pattern with respect to the predefined line pattern, i.e. the line pattern projected on the surface, is directly caused by the texture of the surface. The at least one texture parameter derived in step (iii) of the inventive method therefore reflects the deviation of the line pattern of the surface from the predefined line pattern projected onto the surface. Thus, deriving the at least one texture parameter in step (iii) comprises determining the deviation of the line pattern of the surface from a predefined line pattern projected onto the surface.

Step (iii) comprises extracting a plurality of lines from the processed image data, preferably the binary image data, using a pattern recognition algorithm and forming at least one concatenated line by concatenating at least two extracted lines. The concatenated line is longer than each extracted line and correspondingly comprises more texture information than each extracted line, thus allowing to use image data obtained from a small measurement area to reliably determine the texture of the surface. This is particular useful if the image data can only be obtained for a rather small surface area, which is, for example, the case during preparation of a coating layer by curing the respective coating composition in an oven because said setup only allows to acquire an image of the coating layer in a very small area to avoid unnecessary heat losses which are due to an opening in the oven required to capture the image data of the surface during curing of the coating layer. A wavelength spectrum of each concatenated line is then calculated by means of a fast Fourier transformation. The fast Fourier transformation extracts a periodicity content of a lateral deviation of the concatenated line from the corresponding concatenated original lines. The periodicity content may be easily transformed to a wavelength spectrum of the concatenated line. The calculated wavelength spectrum is in turn strongly correlated with recurring patterns of the texture of the surface.

The at least one texture parameter may be derived as a spectral peak of the calculated wavelength spectrum. The wavelength of the spectral peak corresponds to the dominant recurring pattern of the texture of the surface. The wavelength of the spectral peak, i.e. the dominant spatial repetition rate, may be considered as a first texture parameter.

Alternatively, the at least one texture parameter is derived from a wavelength range of the calculated wavelength spectrum containing a wavelength of a spectral peak of the calculated wavelength spectrum. The use of a wavelength range instead of a wavelength supports a classification of surfaces with respect to their appearance, i.e. allocating a surface to a class of surfaces having a similar appearance. Said wavelength range containing a spectral peak of the calculated wavelength spectrum may be considered as the second texture parameter.

In this regard, the wavelength range is preferably a predetermined shortwave wavelength range from 0.3 mm up to 1 mm or a predetermined longwave wavelength range from greater than 1 mm to 10 mm. The shortwave wavelength range covers textures having fine recurring patterns. The longwave wavelength range is adjacent to the shortwave wavelength range and covers textures having rough recurring patterns.

Alternatively, a shortwave wavelength range may be derived by comparing the surface with a standardized reference surface using the inventive method. Standardized reference surfaces are provided to cover the shortwave wavelength range. A surface is associated to the shortwave wavelength range when the surface reflects an incident light approximately as does a standard reference surface.

Step (iv):

The at least one texture parameter derived in step (iii) is provided via an output channel. Suitable output channels are, for example, physical output channels like displays, networks or logical output channels, like API, function call, databases or the like. Very preferably, a display device is used as output channel. Suitable display devices are well known to the person skilled in the art and include display devices that provide visual information, this information typically may be logically and/or physically organized as an array of pixels.

Optional Step (v):

The inventive method may further comprise monitoring or controlling, based on the texture parameter derived in step (iii), the texture of the surface.

Since image data can be repeatedly provided and processed during the preparation of the surface, the inventive method allows to monitor the texture of the surface during its preparation via the at least one texture parameter derived from said image data. A preferred first alternative of optional step (v) of the inventive method therefore comprises monitoring the texture of the surface (5) by repeatedly determining the at least texture parameter of the surface derived from the line pattern in the processed image data, preferably during the preparation of the at least one surface, and optionally storing the determined at least one texture parameter on at least one storage device. The stored texture parameters can then be used to correlate said parameters to the application, drying, curing and cooling parameters used at the point in time when the image data was obtained in order to evaluate the influence of said parameters on the determined texture parameters. The image data provided repeatedly during the preparation process of the surface can be collected at predefined time points or at randomly selected time points. In order to correlate the determined at least one texture parameter with the preparation conditions used to prepare the surface, it is preferred to store said preparation conditions at the points in time when the image data is collected and to store them on at least one storage device. Suitable storage devices can be selected from discs, hard drives, servers, clouds, networks or the like.

Determination of the at least one texture parameter during the preparation of the surface also allows to modify the conditions for preparation of the surface in order to adjust the at least one texture parameter to a predefined value or range. This allows to tune the texture of the surface during its preparation by modifying the preparation conditions and thus reduces the occurrence of undesired texture of the prepared surface. The inventive method thus provides an efficient method to prepare surfaces having predefined textures. An alternative optional step (v) therefore comprises controlling the texture of the surface by comparing, preferably repeatedly comparing,—during the preparation of the surface—the at least one texture parameter of the surface derived from the line pattern in the processed image data with at least one predefined texture parameter and modifying at least one parameter used during the preparation of the surface in case the derived at least one texture parameter deviates from the predefined texture parameter by a predefined threshold value. Preferably, the at least one parameter which is modified during the preparation of the surface is selected from application conditions, drying conditions, curing conditions, cooling conditions or any combination therefrom.

In many embodiments the inventive method is carried out by a processor executing a program code implementing the method. In this way assessing the flow of the sprayed coating may be automated at least partially which increases an efficiency and accuracy of the assessing process.

It is an essential advantage of the method according to the present invention that the texture of the surface may be assessed very efficiently and that the method further allows to monitor or control the texture of the surface, thus permitting to correlate the derived texture parameter(s) with the conditions used to prepare the surface in order to derive the influence of said conditions on the obtained texture or to control the texture of the surface during its preparation in order to obtain the desired texture of the prepared surface. The method is based on a very simple arrangement and uses image processing and a fast Fourier transformation. The image processing and the fast Fourier transformation may be carried out automatically by a computer. Moreover, the method can be easily incorporated into currently used surface preparation processes, preferably processes to prepare coatings on objects.

Inventive System:

A further aspect of the invention is a system for assessing and optionally monitoring or controlling a texture of a surface, comprising:

(a) an input channel connected to a processing device, said input channel being configured to provide image data to a processing device, (b) a processing device configured to
process image data of a surface comprising a line pattern, wherein the line pattern is obtained by projecting a predefined line pattern onto the surface, and derive at least one texture parameter of the surface from the line pattern in the processed image data by extracting a plurality of parallel lines from the processed image data using a pattern recognition algorithm, forming at least one concatenated line by concatenating at least two extracted parallel lines and calculating a wavelength spectrum of each concatenated line by means of a fast Fourier transformation, and optionally monitor and/or control the at least one derived texture parameter by providing a monitoring or controlling signal to a surface preparation device, (c) an output channel configured to display the derived at least one texture parameter, (d) optionally at least one surface preparation device connected to the processing device and configured to prepare the surface.

Suitable processing devices comprise at least one processor, an operating system configured to perform executable instructions, a memory, and a computer program including instructions executable by the digital processing device to perform the inventive method. Moreover, the processing and/or output device may further comprise a display having a screen for displaying a graphical user interface (GUI).

The surface preparation device may comprise at least one application device configured to apply a liquid or solid coating composition to the surface and/or at least on device configured to flash off the applied coating layer and/or cure the applied coating layer and/or cool the cured coating layer.

The system may further comprise at least one line pattern projecting device configured to project a predefined line pattern on the surface. Suitable line pattern projecting devices may include a white board having a predefined line pattern and a light source, preferably a white light source.

The system is especially suitable in connection with the inventive method as previously described because it allows to efficiently assess, monitor or control the texture of a surface, preferably the texture of a coating applied to an object.

What has been said about the inventive method applies mutatis mutandis with respect to further preferred embodiments of the inventive system.

Inventive Computer Program Product:

Another aspect of the invention is a computer program product for assessing and optionally monitoring or controlling a texture of a surface, comprising a data carrier storing a program code to be executed by a processor. The data carrier may be used for installing the stored program code and/or for upgrading an installed program code with the stored program code.

According to the invention, the program code implements the inventive method. The stored program code enables for efficiently assessing and optionally monitoring or controlling the texture of a surface. Since the monitoring or controlling of the texture of the surface can be done repeatedly during the preparation of said surface, the quality of the obtained surface, preferably coating, can be optimized, thus allowing an efficient preparation of surfaces having the desired texture properties.

What has been said about the inventive method and the inventive system applies mutatis mutandis with respect to further preferred embodiments of the inventive computer program product.

Inventive Use:

A further object of the present invention is the use of the at least one texture parameter determined according to the inventive method for monitoring or controlling the texture of a surface.

Moreover, the inventive method can be used for detecting surface defects, such as craters.

With particular preference, the inventive method is used during the preparation of a coating or coating layer, preferably the outermost coating layer, with particular preference a coating layer on an automobile body or automobile body parts. Thus, a further object of the present invention is the use of the at least one texture parameter determined according to the inventive method for manufacturing coated objects, preferably automobile bodies and/or automobile body parts. In this respect, it is particularly preferred, it the at least one texture parameter determined according to the inventive method is used in a connection with an automobile paint line.

The inventive use allows to monitor or control the texture of the surface by repeatedly determining said texture parameter during the preparation of said surface, thus resulting in an efficient production process of coated objects.

What has been said about the inventive method applies mutatis mutandis with respect to further preferred embodiments of the inventive use.

The invention is described in particular by the following embodiments:

Embodiment 1: a method for assessing and optionally monitoring or controlling a texture of a surface 5, comprising the steps of:

(i) providing via an input channel to a processing device image data 10 of a surface (5) comprising a line pattern 11, 12; 21, 22; 31, 32, wherein the line pattern 11, 12; 21, 22; 31, 32 is obtained by projecting a predefined line pattern onto the surface;

(ii) processing by the processing device the provided image data 10;

(iii) deriving at least one texture parameter 75 of the surface 5 from the line pattern 11, 12; 21, 22; 31, 32 in the processed image data 30 by extracting a plurality of parallel lines 40, 41, 42, 43, 44 from the processed image data using a pattern recognition algorithm, forming at least one concatenated line 50, 60 by concatenating at least two extracted parallel lines 41, 42, 43, 44 and calculating a wavelength spectrum 73 of each concatenated line 50, 60 by means of a fast Fourier transformation; and (iv) providing the at least one texture parameter 75 via an output channel.

Embodiment 2: the method according to embodiment 1, further comprising monitoring or controlling, based on said derived at least one texture parameter 75, the texture of the surface 5.

Embodiment 3: the method according to embodiment 1 or 2, wherein the surface 5 is a coating layer, particularly a clear coat layer.

Embodiment 4: the method according to embodiment 3, wherein the image data 10 provided via an input channel to a processing device is obtained immediately after applying the coating layer and/or during or after flashing off the applied coating layer and/or during or after curing the applied coating layer and/or during or after cooling the cured coating layer.

Embodiment 5: the method according to any of the preceding embodiments, wherein the portion 13, 23, 33 of the surface 5 between at least two lines of the line pattern 11,

12; 21, 22; 31, 32 has an area in a range from 10 mm×10 mm to 50 mm×50 mm, particularly an area of 15 mm×15 mm.

Embodiment 6: the method according to any of the preceding embodiments, wherein the line pattern 11, 12; 21, 22; 31, 32 is a periodic or non-periodic line pattern, preferably a periodic line pattern 11, 12; 21, 22; 31, 32.

Embodiment 7: the method according to any of the preceding embodiments, wherein the line pattern 11, 12; 21, 22; 31, 32 comprises a plurality of lines 11, 12; 21, 22; 31, 32, particularly a grid of lines 11, 12; 21, 22; 31, 32, most preferably an orthogonal grid of lines 11, 12; 21, 22; 31, 32.

Embodiment 8: the method according to any of the preceding embodiments, wherein processing the provided image data 10 in step (ii) comprises extracting the line pattern information from the image data 10 provided in step (i).

Embodiment 9: the method according to embodiment 8, wherein processing the provided image data 10 comprises pre-processing the provided image data 10.

Embodiment 10: the method according to embodiment 8 or 9, wherein processing the obtained image data 10 comprises converting the obtained image data 10 or the pre-processed image data 20 into binary image data 30.

Embodiment 11: the method according to any of the preceding embodiments, wherein deriving the at least one texture parameter 75 comprises determining the deviation of the line pattern 11, 12; 21, 22; 31, 32 of the surface 5 from a predefined line pattern projected onto the surface 5.

Embodiment 12: the method according to any of the preceding embodiments, wherein the at least one texture parameter 75 is derived as a spectral peak 74 of the calculated wavelength spectrum 73.

Embodiment 13: the method according to any one of embodiments 1 to 11, wherein the at least one texture parameter 75 is derived as a wavelength range of the calculated wavelength spectrum 73 containing a spectral peak 74.

Embodiment 14: the method according to embodiment 13, wherein the wavelength range is a predetermined shortwave wavelength range from 0.3 mm up to 1 mm or a predetermined longwave wavelength range from greater than 1 mm to 10 mm.

Embodiment 15: the method according to embodiment 13, wherein the wavelength range is a shortwave wavelength range derived by comparing the surface 5 with a standardized reference surface.

Embodiment 16: the method according to any of the preceding embodiments, wherein the output channel is a display device.

Embodiment 17: the method according to any of the embodiments 2 to 16, wherein monitoring the texture of the surface 5 comprises repeatedly determining the at least texture parameter 75 of the surface 5 derived from the line pattern 11, 12; 21, 22; 31, 32 in the processed image data 30, preferably during the preparation of the at least one surface 5, and optionally storing the determined at least one texture parameter 75 on at least one storage device.

Embodiment 18: the method according to any embodiment 17, wherein monitoring the texture of the surface 5 further comprises correlating the repeatedly determined at least one texture parameter 75 with the surface preparation parameters used at the points in time when the image data 10 used to derive the at least one texture parameter 75 is obtained.

Embodiment 19: the method according to any of the embodiments 2 to 16, wherein controlling the texture of the surface 5 comprises comparing, preferably repeatedly comparing,—during the preparation of the surface 5—the at least one texture parameter 75 of the surface 5 derived from the line pattern 11, 12; 21, 22; 31, 32 in the processed image data 30 with at least one predefined texture parameter and modifying at least one parameter used during the preparation of the surface 5 in case the derived at least one texture parameter 75 deviates from the predefined texture parameter by a predefined value.

Embodiment 20: the method according to any of the preceding embodiments, being executed by a processor executing a program code implementing the method.

Embodiment 21: a system for assessing and optionally monitoring or controlling a texture of a surface 5, comprising:

(a) an input channel connected to a processing device, said input channel being configured to provide image data 10 to a processing device, (b) a processing device configured to process image data 10 of a surface 5 comprising a line pattern 11, 12; 21, 22; 31, 32, wherein the line pattern 11, 12; 21, 22; 31, 32 is obtained by projecting a predefined line pattern onto the surface and derive at least one texture parameter 75 of the surface 5 from the line pattern 11, 12; 21, 22; 31, 32 in the processed image data 30 by extracting a plurality of parallel lines 40, 41, 42, 43, 44 from the processed image data using a pattern recognition algorithm, forming at least one concatenated line 50, 60 by concatenating at least two extracted parallel lines 41, 42, 43, 44 and calculating a wavelength spectrum 73 of each concatenated line 50, 60 by means of a fast Fourier transformation, and optionally monitor and/or control the at least one derived texture parameter 75 by providing a monitoring or controlling signal to a surface preparation device, (c) an output channel configured to display the derived at least one texture parameter 75, (d) optionally at least one surface preparation device connected to the processing device and configured to prepare the surface 5.

Embodiment 22: a system according to embodiment 21, further comprising at least one line pattern projecting device configured to project a predefined line pattern on the surface.

Embodiment 23: a computer program product for assessing and optionally monitoring or controlling a texture of a surface 5, comprising a data carrier storing a program code to be executed by a processor, the program code implementing a method according to one of embodiments 1 to 21.

Embodiment 24: use of the at least one texture parameter 75 determined according to a method of any of embodiments 1 to 20 for monitoring or controlling the texture of a surface.

Embodiment 25: use of the at least one texture parameter 75 determined according to a method of any of embodiments 1 to 20 for manufacturing coated objects, preferably automobile bodies and/or automobile body parts.

Further advantages and configurations of the invention become apparent from the following description and the enclosed drawings.

It shall be understood that the features described previously and to be described subsequently may be used not only in the indicated combinations but also in different combinations or on their own without leaving the scope of the present invention.

BRIEF DESCRIPTION OF THE DRAWINGS

FIG. 5 schematically shows a plurality of lines extracted from the binary image data shown in FIG. 4;

FIG. 6 schematically shows four extracted lines;

FIG. 7 schematically shows a concatenated line comprising the four lines shown in FIG. 6;

FIG. 8 shows a binary representation of a concatenated line;

FIG. 9 shows a graph comprising a wavelength spectrum calculated from the concatenated line shown in FIG. 8.

DETAILED DESCRIPTION OF THE DRAWINGS

Figure 1:
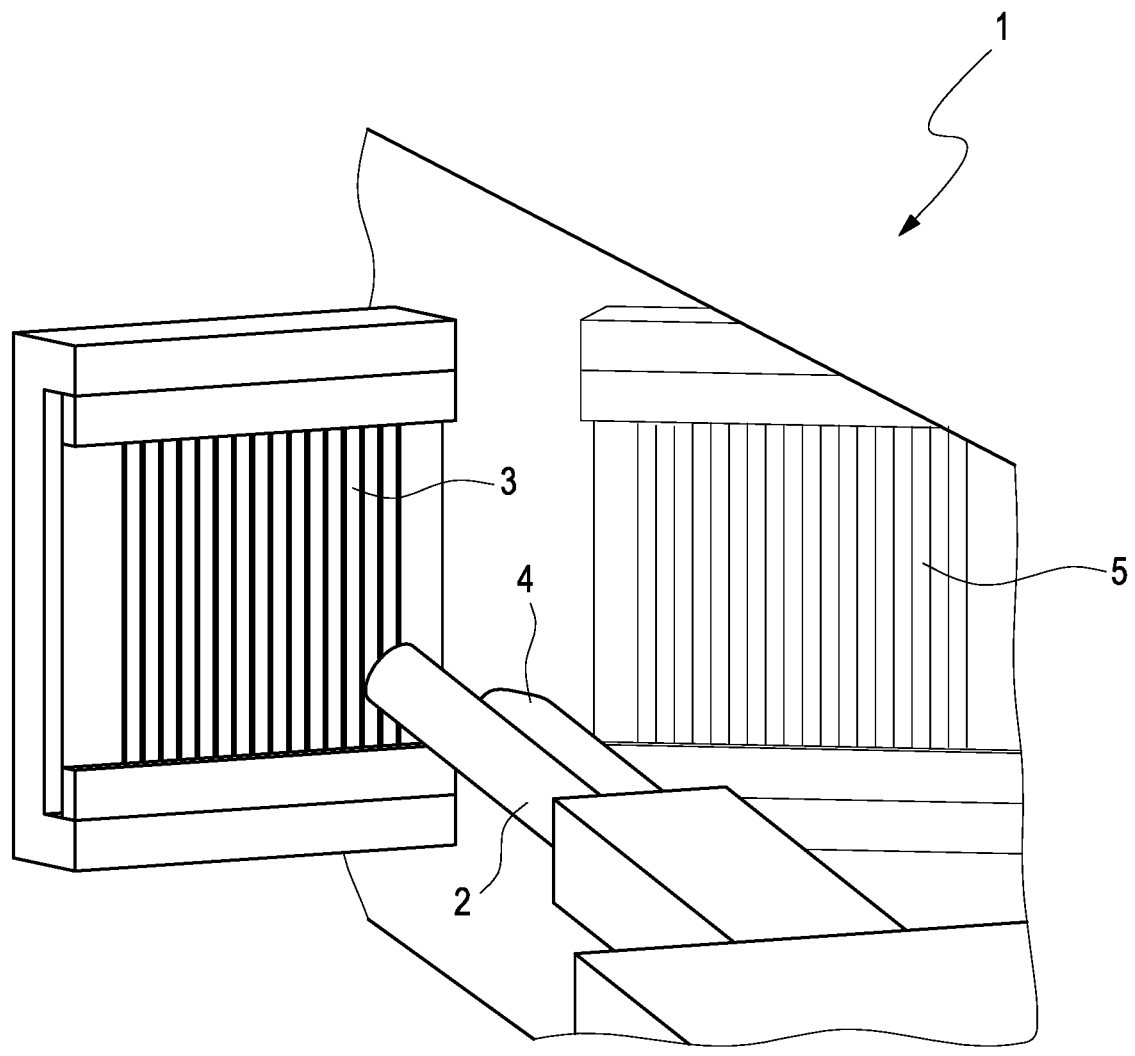
FIG. 1 schematically shows a perspective view of an arrangement for carrying out a method according to an embodiment of the invention.

FIG. 1 schematically shows a perspective view of an arrangement 1 for carrying out a method according to an embodiment of the invention. The arrangement 1 comprises a surface 5 and a camera 4 with an optical axis extending onto the surface 5, i.e. the camera 4 is directed to the surface 5.

The arrangement 1 further comprises a white board 3 having a predefined line pattern and a white light source 2 being arranged for illuminating the white board 3. The camera 4, the surface 5 and the white board 3 are preferably arranged relative to each other such that the predefined line pattern of the white board 3 is projected onto the surface and the line pattern resulting from the projection on the surface 5 is parallel to the optical axis of the camera 4. The predefined line pattern of the white board 3 may comprise a plurality of parallel lines or preferably an orthogonal grid of parallel straight lines. Respective parallel straight lines may additionally be equally spaced. However, the line pattern of the white board may also be a non-periodic line pattern. The line pattern reflected by the surface 5 deviates from the predefined line pattern of the white board 3 (see FIG. 2, 3, 4). The degree of deviation is directly correlating to the surface roughness, i.e. the texture, of the surface.

The white board 3 is illuminated by the light source 2. The white board 3, i.e. the predefined line pattern of the white board 3, is projected onto the surface 5 and the surface 5 comprising the projected line pattern is captured by the camera 4. The surface 5 comprising the line pattern may be a coating layer, particularly a clearcoat layer. The coating may have been applied onto an object, preferably a car body part, in a spraying process, preferably a bell spraying process. Moreover, the applied coating layer may have been subsequently flashed off and/or cured and/or cooled. However, the invention is not restricted to assessing and optionally monitoring or controlling the texture of a coating or coating layer.

Figure 2:
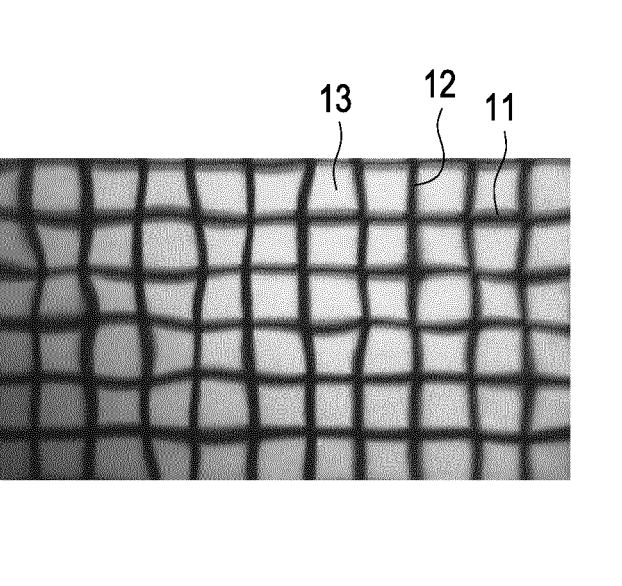
FIG. 2 shows image data obtained by projecting a predefined orthogonal grid of lines onto the surface.

FIG. 2 shows image data 10 of the surface 5 captured by the camera 4. The image data 10 may be captured immediately after applying the coating layer and/or during or after flashing off the applied coating layer and/or during or after curing the applied coating layer and/or during or after cooling the cured coating layer.

The captured image data 10 comprises a portion 13, 23, 33 of the surface 5 and a portion of the surface 5 comprising the line pattern 11, 12; 21, 22; 31, 32. The line pattern 11, 12; 21, 22; 31, 32 comprises horizontal lines 11, 21, 31 and vertical lines 12, 22, 32. The portion 13, 23, 33 has an exemplary area of 15 mm×15 mm and may generally have an area in a range from 10 mm×10 mm to 50 mm×50 mm.

Figure 3:
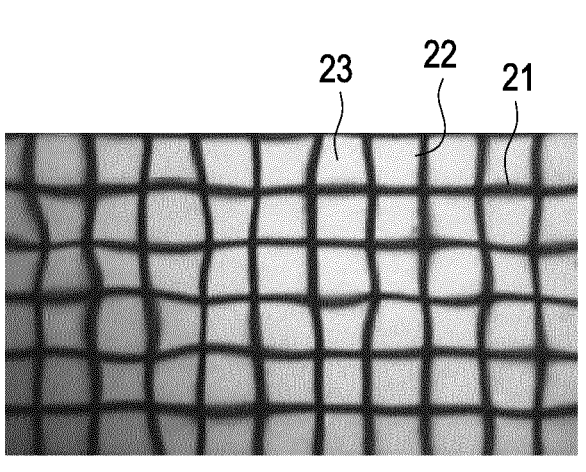
FIG. 3 shows pre-processed image data obtained by pre-processing the image data shown in FIG. 2.

FIG. 3 shows the pre-processed image data 20 obtained by pre-processing the captured image data 10 shown in FIG. 2. Processing the captured image data 10 may comprise pre-processing the captured image data 10 by increasing a contrast, a sharpness, a brightness or the like of the captured image data 10.

Figure 4:
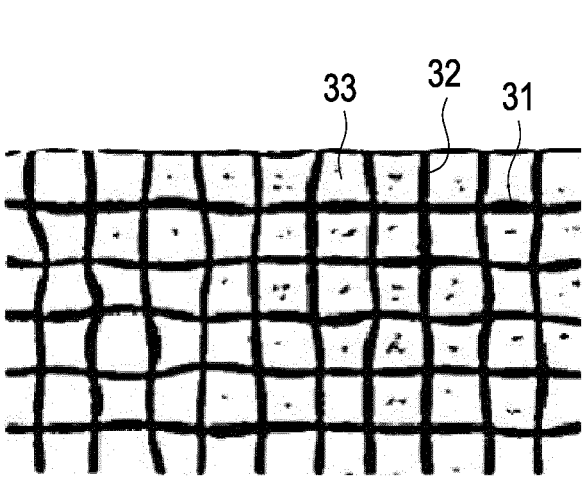
FIG. 4 shows binary image data obtained by converting the pre-processed image data shown in FIG. 3.

FIG. 4 shows the binary image data 30 obtained by converting the pre-processed image data 20 shown in FIG. 3.

In a further step, the at least one texture parameter 75 of the surface portion 13, 23, 33 is derived from the extracted line pattern information in the processed image data 30, i.e. in the binary image data 30. Deriving the at least one texture parameter 75 comprises extracting a plurality of lines 40, 41, 42, 43, 44 from the binary image data 30 by using a pattern recognition algorithm. FIG. 5 shows the plurality of lines 40 extracted from the binary image data 30 shown in FIG. 4. FIG. 6 exemplarily shows four extracted lines 41, 42, 43, 44.

Deriving the at least one texture parameter 75 further comprises forming at least one concatenated line 50, 60 by concatenating at least two extracted lines 41, 42, 43, 44.

FIG. 7 schematically shows a concatenated line 50 comprising four segments 51, 52, 53, 54 corresponding to the four lines 41, 42, 43, 44 shown in FIG. 6. FIG. 8 shows a binary representation of a concatenated line 60 having been concatenated by a larger plurality of extracted lines 40.

Deriving the at least one texture parameter 75 comprises calculating a wavelength spectrum 73 of each concatenated line 60 by means of a fast Fourier transformation. FIG. 9 shows a graph 70 comprising an abscissa 71 indicating a wavelength, an ordinate 72 indicating a spectral content of a wavelength and a wavelength spectrum 73 calculated from the concatenated line 60 shown in FIG. 8. The calculated wavelength spectrum 73 comprises a spectral peak 74 at a wavelength 75. The wavelength 75 of the spectral peak 74 may be derived as a first texture parameter of the surface 5.

REFERENCE NUMERALS 1 arrangement
2 light source
3 white board
4 camera
5 surface
10 captured image
11 horizontal line
12 vertical line
13 surface portion
20 pre-processed image
21 horizontal line
22 vertical line
23 surface portion
30 processed image, binary image
31 horizontal line
32 vertical line
33 surface portion
40 extracted line
41 extracted line
42 extracted line
43 extracted line
44 extracted line
50 concatenated line
51 segment
52 segment
53 segment
54 segment
60 concatenated line 70 graph
71 abscissa
72 ordinate
73 wavelength spectrum
74 spectral peak
75 wavelength of the spectral peak

The invention claimed is:

1. A method for assessing and optionally monitoring a texture of a surface, comprising the steps of:
   (i) providing, via an input channel, to a processing device, image data of a surface comprising a line pattern, wherein the line pattern is obtained by projecting a predefined line pattern onto the surface;
   (ii) processing, by the processing device, the provided image data;
   (iii) deriving at least one texture parameter of the surface from the line pattern in the processed image data by extracting a plurality of parallel lines from the processed image data using a pattern recognition algorithm, forming at least one concatenated line by concatenating at least two extracted parallel lines, and calculating a wavelength spectrum of each concatenated line by means of a fast Fourier transformation; and
   (iv) providing the at least one texture parameter via an output channel.

2. The method according to claim 1, further comprising monitoring, based on said derived at least one texture parameter, the texture of the surface.

3. The method according to claim 1, wherein the surface is a coating layer.

4. The method according to claim 1, wherein the line pattern is a plurality of lines.

5. The method according to claim 1, wherein processing the provided image data in step (ii) comprises extracting the line pattern information from the image data provided in step (i).

6. The method according to claim 5, wherein processing the obtained image data comprises converting the obtained image data into binary image data.

7. The method according to claim 1, wherein deriving the at least one texture parameter comprises determining a deviation of the line pattern of the surface from the predefined line pattern projected onto said surface.

8. The method according to claim 1, wherein the at least one texture parameter is derived as a spectral peak of the calculated wavelength spectrum.

9. The method according to claim 1, wherein the at least one texture parameter is derived as a wavelength range of the calculated wavelength spectrum containing a spectral peak.

10. The method according to claim 1, wherein monitoring the texture of the surface comprises repeatedly determining the at least one texture parameter of the surface derived from the line pattern in the processed image data, and optionally storing the determined at least one texture parameter on at least one storage device.

11. The method according to claim 10, wherein monitoring the texture of the surface further comprises correlating the repeatedly determined at least one texture parameter with surface preparation parameters used at points in time when the image data used to derive the at least one texture parameter is obtained.

12. A system for assessing and optionally monitoring a texture of a surface, comprising:

(a) an input channel connected to a processing device, said input channel being configured to provide an image data to the processing device,
(b) the processing device configured to
process image data of a surface comprising a line pattern, wherein the line pattern is obtained by projecting a predefined line pattern onto the surface, and
derive at least one texture parameter of the surface from the line pattern in the processed image data by extracting a plurality of parallel lines from the pro-cessed image data using a pattern recognition algo-rithm, forming at least one concatenated line by concatenating at least two extracted parallel lines, and calculating a wavelength spectrum of each con-catenated line by means of a fast Fourier transfor-mation, and
optionally, monitor the at least one derived texture parameter by providing a monitoring signal to a surface preparation device, and
(c) an output channel configured to display the derived at least one texture parameter, and
(d) optionally, at least one surface preparation device connected to the processing device and configured to prepare the surface.

13. At least one non-transitory computer-readable storage medium having stored thereon a computer-executable pro-gram code for assessing and optionally monitoring a texture of a surface, wherein, when the program code is executed by a processor, the program code uses the processor to imple-ment a method according to claim 1.

14. A method of using the at least one texture parameter determined according to a method of claim 1, wherein the at least one texture parameter is associated with a coating applied to the surface, the method comprising using the at least one texture parameter for manufacturing objects having the surface and being coated with the coating.

15. The method according to claim 1, wherein the surface is a clearcoat layer.

16. The method according to claim 1, wherein the line pattern is a grid of lines.

17. The method according to claim 1, wherein the line pattern is an orthogonal grid of lines.

18. The method according to claim 1, wherein monitoring the texture of the surface comprises repeatedly determining the at least one texture parameter of the surface derived from the line pattern during preparation of the surface, and optionally storing the determined at least one texture param-eter on at least one storage device.

* * * * *